(12) United States Patent
Abe

(10) Patent No.: US 7,706,462 B2
(45) Date of Patent: Apr. 27, 2010

(54) TRANSCEIVER USING TWO OR MORE ANTENNAS, AND A TRANSMITTING-RECEIVING METHOD THEREOF

(75) Inventor: Tetsushi Abe, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1307 days.

(21) Appl. No.: 11/167,314

(22) Filed: Jun. 28, 2005

(65) Prior Publication Data

US 2005/0286618 A1    Dec. 29, 2005

(30) Foreign Application Priority Data

Jun. 28, 2004    (JP)    ............... 2004-190015

(51) Int. Cl.
*H04B 7/02*    (2006.01)
(52) U.S. Cl. ........................................ 375/267
(58) Field of Classification Search ............ 370/208, 370/252; 375/219, 225, 260, 267; 455/501
See application file for complete search history.

(56) References Cited

U.S. PATENT DOCUMENTS

| 7,012,883 | B2* | 3/2006 | Jalali et al. | 370/208 |
| 7,236,537 | B2* | 6/2007 | Hottinen et al. | 375/267 |
| 2003/0013468 | A1* | 1/2003 | Khatri | 455/501 |
| 2003/0161412 | A1* | 8/2003 | Niida et al. | 375/299 |
| 2003/0223391 | A1* | 12/2003 | Malaender et al. | 370/334 |
| 2004/0120411 | A1* | 6/2004 | Walton et al. | 375/260 |
| 2005/0286618 | A1* | 12/2005 | Abe | 375/219 |
| 2006/0114815 | A1* | 6/2006 | Hasegawa et al. | 370/208 |

FOREIGN PATENT DOCUMENTS

| JP | 2003-244045 | 8/2003 |
| JP | 2004-194262 | 7/2004 |
| KR | 10-2004-0015000 | 2/2004 |
| KR | 10-2004-0053348 | 6/2004 |
| WO | WO 03/085875 A1 | 10/2003 |
| WO | WO 03/085876 A1 | 10/2003 |

OTHER PUBLICATIONS

"Selection of MCS levels in HSDPA", NEC, Telecom MODUS. 3GPP TSG RAN WG1 Technical Document, R1-01-0589, May 21-25, 2001, pp. 1-4.

* cited by examiner

*Primary Examiner*—David C Payne
*Assistant Examiner*—Leon-Viet Q Nguyen
(74) *Attorney, Agent, or Firm*—Oblon, Spivak, McClelland, Maier & Neustadt, L.L.P.

(57) ABSTRACT

A transceiver of a MIMO method communication system, and a transmitting-receiving method thereof are disclosed. The transceiver includes one or more antennas for receiving two or more signals transmitted using two or more transmission antennas, a channel estimating unit for estimating a channel of each of the signals, an error detecting unit for performing error detection of each signal based on reliability information added to the signal, and for determining a transmission rate of the signals based on at least one of the channel estimation result and the error detection result of each signal, and a transmission rate determining unit for adjusting the number of signals to be transmitted from the transmission antennas at a predetermined interval.

12 Claims, 7 Drawing Sheets

FIG.2 PRIOR ART

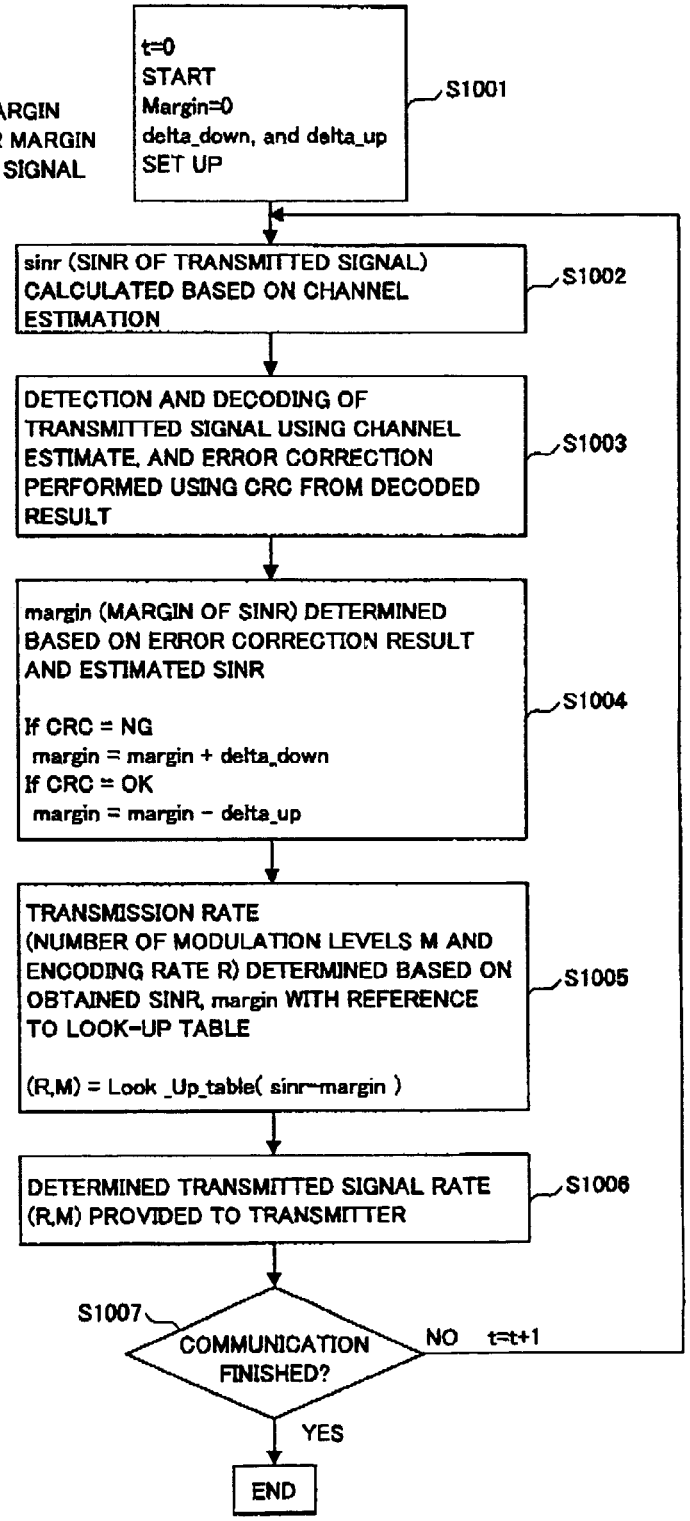

t: RECEIVING FRAME NUMBER
sinr: SINR OF TRANSMITTING SIGNAL
margin: SINR MARGIN
delta_up: INCREMENT WIDTH OF SINR MARGIN
delta_down: DECREMENT WIDTH OF SINR MARGIN
R_i: ENCODING RATE OF TRANSMITTED SIGNAL
M_i: NUMBER OF MODULATION LEVELS S1001
t=0
START
Margin=0
delta_down, and delta_up
SET UP S1002
sinr (SINR OF TRANSMITTED SIGNAL) CALCULATED BASED ON CHANNEL ESTIMATION S1003
DETECTION AND DECODING OF TRANSMITTED SIGNAL USING CHANNEL ESTIMATE, AND ERROR CORRECTION PERFORMED USING CRC FROM DECODED RESULT S1004
margin (MARGIN OF SINR) DETERMINED BASED ON ERROR CORRECTION RESULT AND ESTIMATED SINR If CRC = NG
 margin = margin + delta_down
If CRC = OK
 margin = margin − delta_up S1005
TRANSMISSION RATE
(NUMBER OF MODULATION LEVELS M AND ENCODING RATE R) DETERMINED BASED ON OBTAINED SINR, margin WITH REFERENCE TO LOOK-UP TABLE (R,M) = Look_Up_table( sinr−margin )

S1006
DETERMINED TRANSMITTED SIGNAL RATE (R,M) PROVIDED TO TRANSMITTER

S1007
COMMUNICATION FINISHED? — NO t=t+1
YES
END

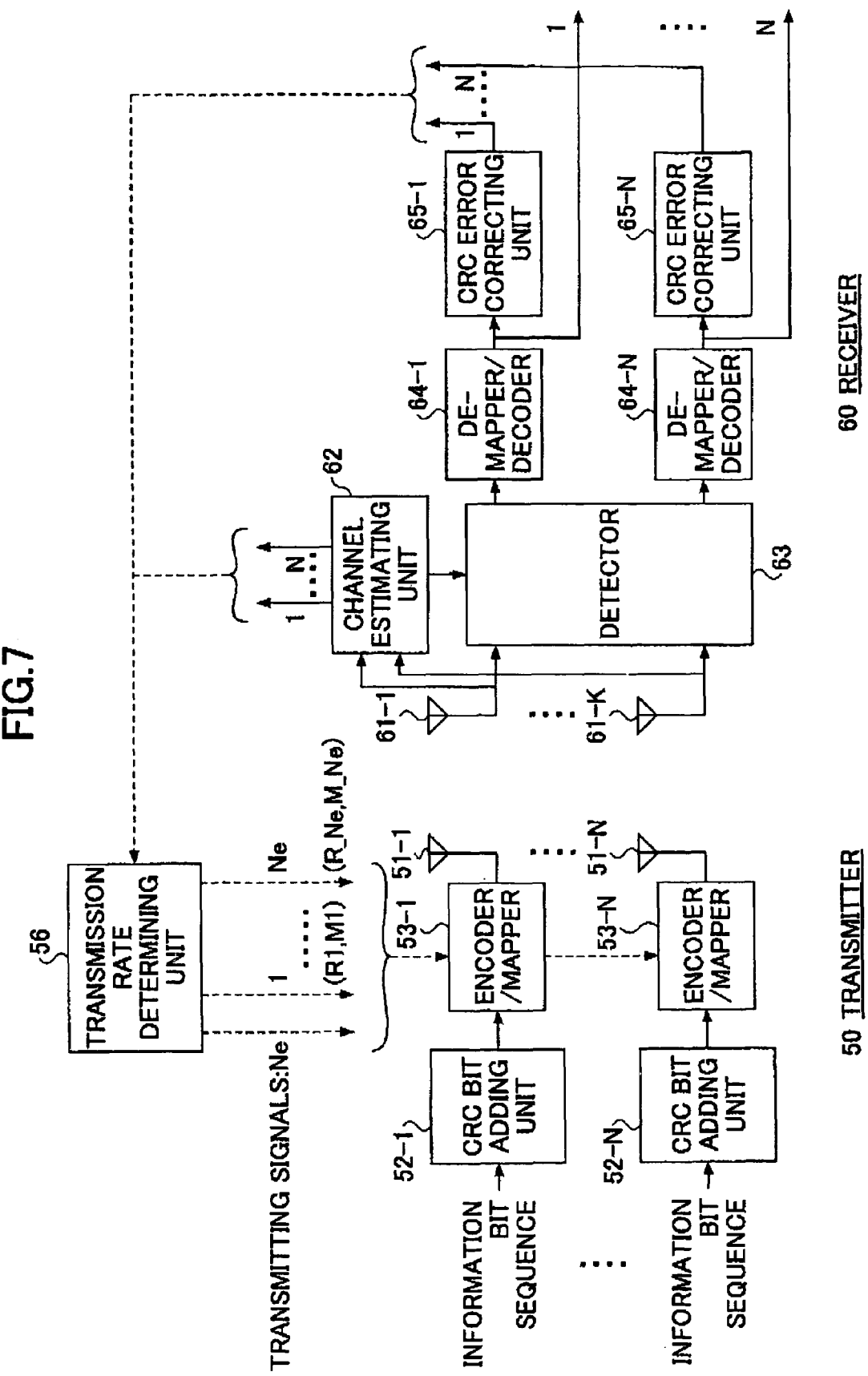

TRANSCEIVER USING TWO OR MORE ANTENNAS, AND A TRANSMITTING-RECEIVING METHOD THEREOF

BACKGROUND OF THE INVENTION

1. Field of the Invention

The present invention relates to a communication technology that uses a MIMO (Multi-Input Multi-Output) antenna system, and especially relates to an adaptive modulation technology of suitably adjusting a transmission rate according to a state of a communication link in the communication system using MIMO.

2. Description of the Related Art

As a technology of realizing radio transmission at high speed and quality using a limited frequency band, there is an adaptive modulation technology. The adaptive modulation technology adaptively sets up a transmission rate (the number of modulation levels, encoding rate, etc.) of a transmitting signal according to the state of a transmission line. For example, low speed QPSK is used when the receiving state of an electric wave is poor, and high-speed 16QAM is used when the receiving state is good. Further, adaptive control is performed as for encoding according to the propagation state (receiving state) such that encoding with a large error correction capability is used when the receiving state is poor, and encoding with a small error correction capability is used when the receiving state is good.

As an index indicative of the state of the transmission line, a ratio of received signal power to interference and noise (SINR), and a Doppler frequency, and the like are used. A method of realizing high-quality communication is known wherein the transmission rate of a signal is determined in consideration of the receiving state (for example, Non-Patent Reference 1).

FIG. 1 shows the configuration of a publicly known adaptive modulation type transceiver that includes a transmitter 100 and a receiver 200. According to the conventional adaptive modulation transmission and reception, a signal is transmitted and received using a pair of antennas, one being by the transmitter and the other being by the receiver. The transmitter 100 includes an antenna 101, a CRC bit adding unit 102, and an encoder/mapper 103 such that reliability information, such as CRC (Cyclic Redundancy Check), is added to a bit sequence of an input information signal. The signal to which CRC is added is then encoded, modulated, and transmitted from the antenna 101. By the receiver, SINR of the transmission line is estimated by a channel estimating unit 202. Further, based on SINR, the received signal is demodulated, and decoded by a detector 203 and de-mapper/decoder 204, respectively. A CRC error detecting unit 205 performs error detection of the decoded signal. A transmission rate determining unit 206 determines the number of modulation levels and the encoding rate of the transmitting signal based on the SINR value and error detection results that are obtained.

FIG. 2 is a flowchart that shows a transmission rate determination process of the conventional transceiver in which adaptive modulation is performed. First, a communication process is started at Step S1001, then a receiving frame number t and a SINR margin are initialized, and an increment width "delta_up" of the SINR margin and a decrement width "delta_down" of the SINR margin are set up.

Next, the SINR value of the transmitted signal is calculated by channel estimation at Step S1002. Further, at Step S1003, detection and decoding of the transmitting signal are performed using the channel estimate, and error detection is performed using CRC from the decoding result. At Step S1004, the SINR margin is obtained based on the error detection result at S1003 and the estimated SINR at S1002. When there is an error in the decoded result (CRC is NG), the SINR margin value is increased by "delta_down", and when the decode result is error-free (CRC is OK), the SINR margin value is decreased by "delta_up".

Next, at Step S1005, the SINR margin value is subtracted from the SINR value, and the transmission rate (the number of modulation levels, the encoding rate, etc.) is determined using the subtracted result and a look-up table. When the communication quality is degraded and an error is detected due to influence of Doppler change of the transmission line, and the like, the transmission rate is determined based on the estimated SINR less the margin value. In this way, precision of transmission rate determination is raised. The look-up table used at Step S1005 is a correspondence table of SINR and transmission rates (the number of modulation levels, the encoding rate, etc.) for a given FER (frame error rate), and can be prepared in advance. At Step S1006, the determined transmission rate is fed back to the transmitter 100. This process is repeated until the communication ends (YES at S1007).

The adaptive modulation described with reference to FIGS. 1 and 2 is an adaptive modulation between the transmitter and the receiver, each having a single antenna. On the other hand, in a case where the mobile communications system uses the MIMO method, i.e., two or more antennas, a method of switching and controlling communication operations of space paths based on the communication quality information of space paths wherein a reception error is detected, is proposed (for example, Patent Reference 1). By this method, in order to prevent signal interference from arising in the paths between two or more antennas, and the connection from being lost, the reception error of two or more space paths is detected, and communication operations of the space paths are suitably switched between two or more kinds of operations based on an error detection result. Specifically, the first kind of operation is disconnecting all paths except for one path, the second kind of operation is performing path diversity, and the third kind of operation is lowering the modulation factor of a path.

[Non-Patent Reference 1] NEC and Telecom Modus, "Selection of MCS levels in HSDPA", 3GPP TSG RAN WG1 Technical Document, R1-01-0589, May 2001

[Patent Reference 1] JPA 2003-244045

DESCRIPTION OF THE INVENTION

Problem(s) to be Solved by the Invention

According to the technology given in the Non-Patent Reference 1, the adaptive modulation/demodulation are carried out with sufficient precision using an error detection result and an estimated SINR value; however, the technology applies to communications with a single transmission antenna, and does not address application to transmission and reception using two or more transmission antennas, which has attracted attention in recent years.

According to the technology given by Patent Reference 1, the mode of operation and the modulation factor are adjusted based on an error rate and an amount of interference of the space path, in which a reception error is detected; however, it does not refer to a method of precisely adjusting the modulation based on reliable error detection. Further, the operation is changed depending on whether the number of paths, in which an error is detected, is one or more than one out of the transmitting paths. That is, a fine adaptive modulation paying attention to each of the transmitting signals is not taken into consideration.

In communications using a single antenna, one set of adjustment parameters, such as the number of modulation levels, an encoding rate, and a spreading coefficient, is to be adjusted for transmitting the signal. Conversely, in a system wherein two or more signals are simultaneously transmitted, it is desired that the adjustment be not only multiplied but be capable of selecting signals to transmit according to propagation environment. Further, it is necessary to determine the adjustment parameters with sufficient precision for each of the transmitting signals.

SUMMARY OF THE INVENTION

In view of above, the present invention aims at offering a transceiver that performs a highly precise and high-quality adaptive modulation in a system wherein two or more signals are simultaneously transmitted and received using two or more antennas, and a communication method thereof, which substantially obviate one or more of the problems caused by the limitations and disadvantages of the related art.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by a transceiver and a communication method thereof particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides the transceiver and the communication method thereof as follows.

Means for Solving the Problem

According to the present invention, not only the number of modulation levels and the encoding rate are obtained in a MIMO communication system, but also the number of signals to transmit is adjusted at a predetermined interval depending on the state of a propagation path of each of two or more signals transmitted from corresponding antennas. That is, a highly precise adaptive modulation is realized by controlling the number of the signals to be transmitted as a parameter of transmission rate control in addition to the determination of the transmission rate for every transmitting signal. The control of the transmission rate depending on the propagation situation can be carried out either by the receiver or by the transmitter.

Specifically, according to the first aspect of the present invention, the transceiver is configured such that the transmission rate control is performed by the receiver. The transceiver includes:

(a) one or more antennas for receiving two or more signals transmitted using two or more transmission antennas;

(b) a channel estimating unit for estimating a channel for each of the signals;

(c) an error detecting unit for detecting an error in each of the signals based on reliability information added to the corresponding signal; and (d) a transmission rate determining unit for determining the transmission rate of the signals based on at least one of a channel estimation result and an error detection result of each of the signals, and for adjusting the number of the signals to be transmitted from the transmission antennas at a predetermined interval.

According to the transceiver as described above, an optimal number of transmitting signals and a transmission rate can be determined by the receiver depending on the propagation state and receiving quality of the signals that are transmitted from the transmission antennas. Only a result of the determination is provided to the transmitter.

The transceiver can also be configured such that the transmission rate is determined based on information fed back to the transmitter from the receiver. In this case, two or more antennas independently transmit two or more respective transmitting signals, and the transmission rate determining unit adjusts the number of the transmitting signals that are to be transmitted from the antennas at a predetermined interval, while determining the transmission rate of the transmitting signals based on at least one of the error detection result and the channel estimation result for each of the transmitting signals based on the reliability information added to the corresponding transmitting signal.

By the configuration of the transceiver as described above, the processing burden can be distributed between the receiver and the transmitter.

Based on the channel estimation result and the error detection result, the transmission rate determining unit calculates the SINR margin of each transmitting signal, and determines the transmission rate of each transmitting signal based on the SINR margin and the channel estimation result. A highly precise adaptive modulation that properly reflects the propagation situation is attained in this way.

Further, based on the channel estimation result and the error detection result, the transmission rate determining unit calculates the SINR margin of each transmitting signal, calculates the average of the SINR margins of all the currently transmitted signals, and adjusts the number of transmitting signals based on this average at the predetermined interval. Since the number of signals to transmit can be adjusted in this manner depending on the actual propagation situation, the optimal transmission rate can be obtained.

According to the second aspect of the present invention, the transmitting-receiving method of a communication system using two or more antennas is offered. This method includes:

(a) a step of estimating a channel of each of the signals transmitted using two or more transmission antennas;

(b) a step of detecting an error in each of the signals based on the reliability information beforehand added to each signal;

(c) a step of determining the transmission rate of the signals based on at least one of the channel estimation result and the error detection result of each signal; and (d) a step of adjusting the number of the signals transmitted from the transmission antennas at a predetermined interval based on at least one of the channel estimation result and the error detection result.

According to the transmitting-receiving method as described above, high-quality communications are realized with highly precise adaptive modulation control in transmission and reception using the MIMO antenna system.

EFFECT OF THE INVENTION

The technique described above realizes a highly precise and high quality adaptive modulation in the communication system using the MIMO method.

Consequently, flexible rate control and improved communication properties under high-speed fading are realized.

BRIEF DESCRIPTION OF THE DRAWINGS

FIG. 2 is a flowchart showing a transmission rate determination process of the conventional adaptive modulation type transceiver;

FIG. 7 is a block diagram showing the configuration of the adaptive modulation type transceiver of the MIMO method according to the second embodiment of the present invention.

DESCRIPTION OF THE PREFERRED EMBODIMENTS

In the following, embodiments of the present invention are described with reference to the accompanying drawings.

Figure 1:
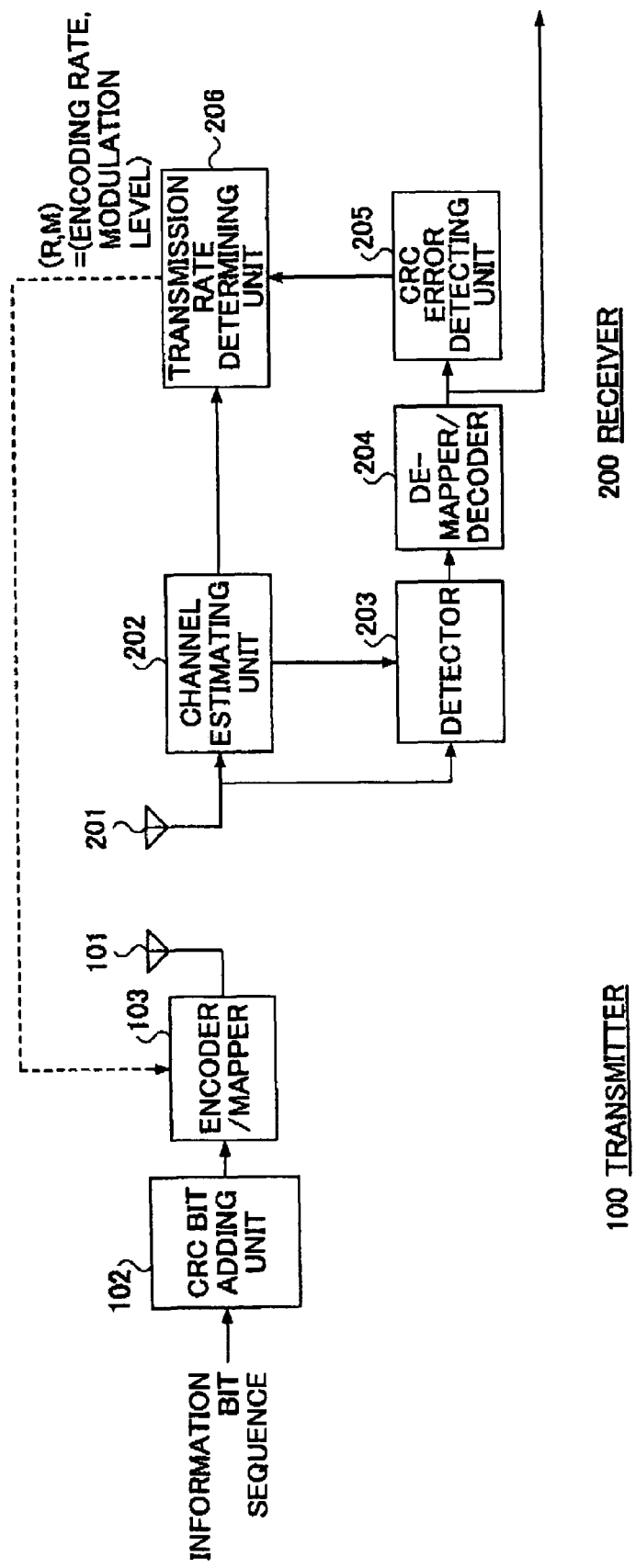
FIG. 1 is a block diagram showing the configuration of a conventional adaptive modulation type transceiver.
Figure 3:
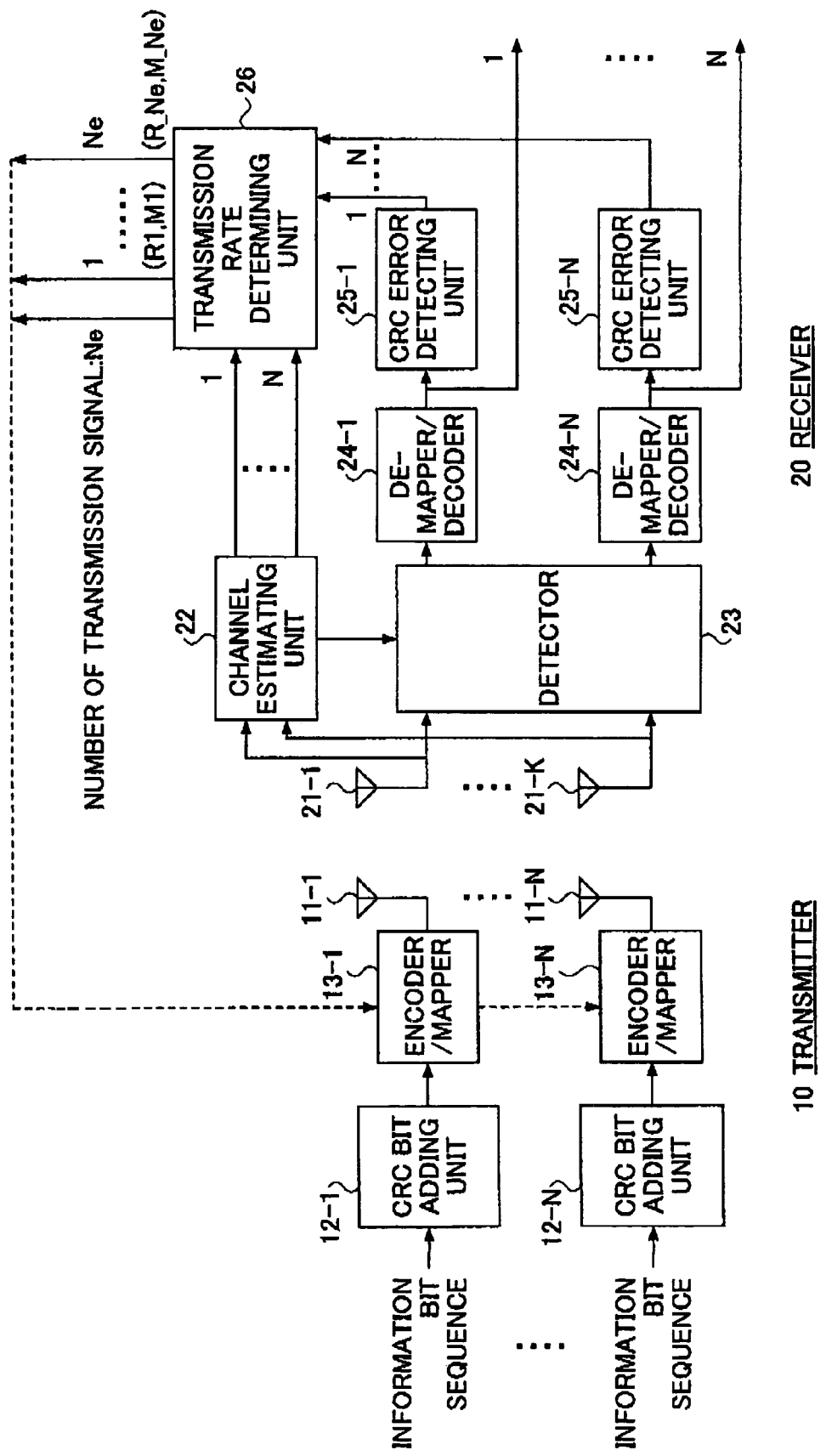
FIG. 3 is a block diagram showing the configuration of an adaptive modulation type transceiver of a MIMO method according to the first embodiment of the present invention.

FIG. 3 is a block diagram showing the structure of an adaptive modulation type transceiver using a MIMO method according to the first embodiment of the present invention. The transceiver includes a transmitter 10 that has two or more transmission antennas 11, namely, 11-1 through 11-N, and a receiver 20 containing two or more receiving antennas 21, namely, 21-1 through 21-K. In FIG. 3, although the transmitter 10 and the receiver 20 are separately illustrated for convenience of description, both are capable of both transmitting and receiving.

In the transmitter 10, an information signal to be transmitted is divided into information bit sequences of a suitable length according to the number of the transmission antennas 11. The transmitter 10 includes N CRC bit adding units 12, namely, 12-1 through 12-N, according to the number of the transmission antennas 11 for adding CRC codes to respective information bit sequences as reliability information, and N encoder/mappers 13, namely, 13-1 through 13-N, for generating transmitting signals by encoding and modulation.

The signals, which count N, transmitted from the transmission antennas 11-1 through 11-N are received by the receiving antennas 21-1 through 21-K of the receiver 20. The signals received by the receiving antennas 21 are provided to a channel estimating unit 22 for estimating the propagation situation, such as SINR, of a channel, and the channel estimating unit 22 provides an estimated result to a transmission rate determining unit 26. A detector 23 detects the N signals from the received signals, using the channel estimation result, and provides the detected signals to respective de-mapper/decoders 24, namely 24-1 through 24-N. The de-mapper/decoders 24-1 through 24-N decode and de-map the respective detected signals, and provide resulting signals to CRC error detecting units 25, namely, 25-1 through 25-N. The CRC error detecting units 25-1 through 25-N perform error detection using the CRC codes added to each information bit sequence, and provide an error detection result to the transmission rate determining unit 26.

The transmission rate determining unit 26 sets up an encoding rate, the number of modulation levels of each transmitting signal being based on the SINR estimated value of each channel and the error detection result of each signal. Further, the number of the signals to be transmitted from the transmission antennas is adjusted at a predetermined interval. The adjustment of the number of the signals to be transmitted may be carried out by determining only the number of the signals to be transmitted, such as using only m of N antennas, or using only m of N beams. Alternatively, the adjustment may be carried out by specifying IDs (identifiers) of either the antennas or the beams, such as using antennas A1, A3, and Am among N antennas, or using beams B1, B3, and Bm among N beams, respectively. The determined transmission rate (that includes the encoding rate and the number of modulation levels), and the adjusted number of transmitting signals are fed back to the transmitter.

Generally, the greater is the number of the transmitting signals, the more remarkable becomes degradation of the receiving quality by Doppler change of the transmission line, resulting in the more frequent occurrence of errors. Accordingly, when the SINR value of a channel is low due to poor propagation environment, or when an error is detected by CRC, the number of transmitting signals is reduced, and the encoding rate and the number of modulation levels are set up for a selected signal. The precision of the rate control is improved by controlling not only the transmission rate but also the number of transmitting signals according to the situation of the transmission line.

The adjustment of the number of transmitting signals is performed every predetermined interval such as every 100 frames. On the other hand, the transmission rate, such as an encoding rate and the number of modulation levels, is determined every frame. The interval of adjusting the number of transmitting signals may be suitably changed such as by 1-1000 msec, and the like. In this way, still finer rate control is attained.

Figure 4:
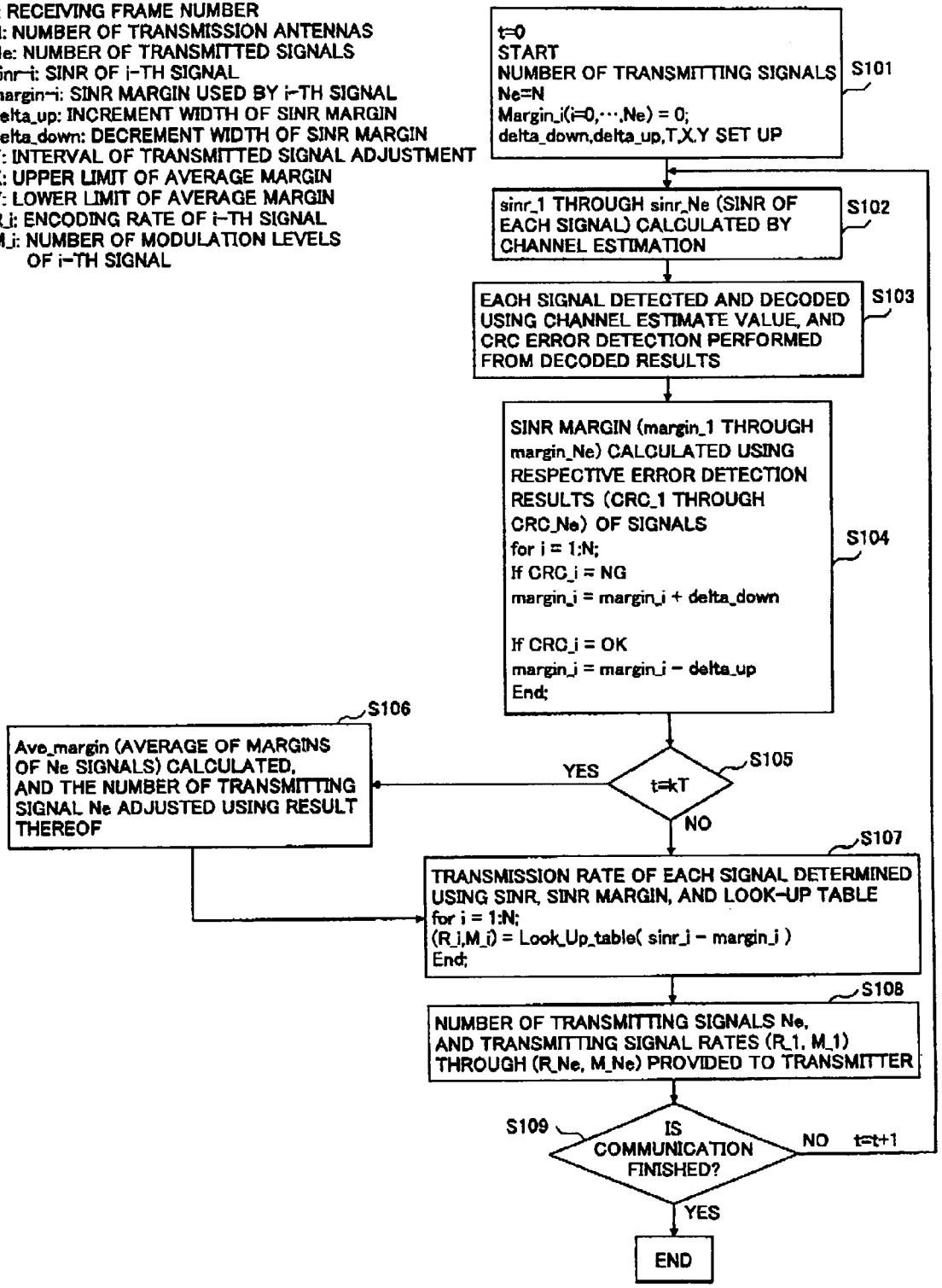
FIG. 4 is a flowchart showing a transmission rate determination process according to the first embodiment of the present invention.

FIG. 4 is a flowchart that shows a transmission rate determination process according to the embodiment of the present invention. First, parameters are initialized at Step S101. The number of transmitting signals Ne is set to N, which is the number of the transmission antennas, and the SINR margin of the i-th transmitting signal is set to 0. Further, an increment width "delta_up" and a decrement width "delta_down" of the SINR margin are set up. Further, the interval T for adjusting the number of transmitting signals, and an upper limit X and a lower limit Y of an averaged margin of the transmitting signals are set up.

Next, at Step S102, SINR is calculated by channel estimation for each of the signals transmitted from Ne antennas (initial value of Ne being N). At Step S103, using the channel estimation value, each transmitting signal is detected, and decoded. Then, error detection is performed using CRC from the decoded result.

At Step S104, the SINR margins (margin_1 through margin_Ne) of the transmitting signals are calculated using the corresponding CRC error detection results. If an error is detected in the i-th transmitting signal (CRC_i=NG at S104), the margin value is increased by "delta_down". If, otherwise, there is no error (CRC_i=OK at S104), the margin value is decreased by "delta_up". In this way, the margin value of each transmitting signal is set up according to the error detection result.

At Step S105, it is determined whether the interval of adjusting the number of transmitting signals is matured. If a frame t, the receiving process of which is presently being carried out, is equal to an integral multiple of the interval T, i.e., t=kT, where k is a natural number (YES at S105), since it is the interval of timing for adjusting the number of transmitting signals, the process proceeds to Step S106. At S106, an average of the margins (Ave_margin) of the transmitting signals, the number being Ne, is calculated, and the number of transmitting signals is adjusted based on a calculation result. If, otherwise, t is not equal to kT (NO at S105), since the interval of timing for adjusting the number of transmitting signals is not reached, the process proceeds to Step S107, wherein the transmission rate of each transmitting signal is determined.

Figure 5:
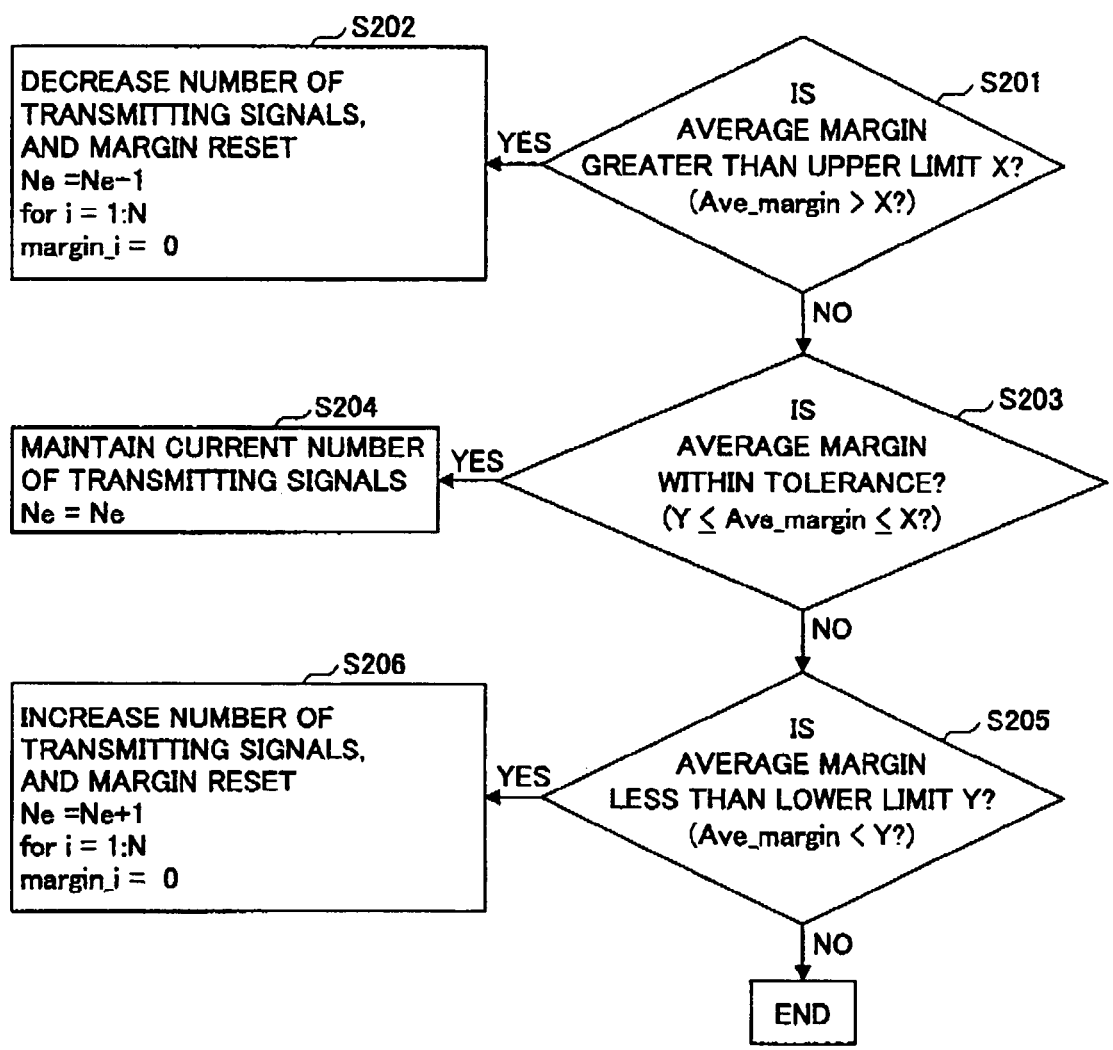
FIG. 5 is a flowchart showing details of an adjustment step of adjusting the number of transmitting signals, the adjustment step being a part of FIG. 4.

FIG. 5 details Step S106 of FIG. 4, wherein the process of adjusting the number of sending signals is described. First, it is determined whether the average (Ave_maragin) of the SINR margins exceeds the upper limit X (S201). If the average margin exceeds the upper limit X (YES at S201), which means that errors are excessive, the number of transmitting signals is decreased, and the margin is reset (S202). Although illustration is omitted, the number of transmitting signals may be gradually decreased depending on the magnitude by which the Ave_margin exceeds the upper limit X.

If the average margin is less than the upper limit X, whether the average margin is within tolerance is determined (S203). If affirmative, the present number of transmitting signals is maintained (S204). If the average margin does not exceed the upper limit, and is not within the tolerance, it is determined whether the average margin is less than the lower limit. If affirmative (YES at S205), since it represents that the number of errors is small, the number of transmitting signals is increased, and the margin is reset (S206).

According to the example of FIG. 5, the number of signals is increased and decreased depending on ranges to which the average of the SINR margins of all the currently transmitted signals belongs. As described above, the number of the antennas may be gradually decreased or increased, one by one, depending on the magnitude exceeding the upper limit, or the magnitude being less than the lower limit, respectively.

When the number of transmission antennas to be used out of N transmission antennas is Ne, any desired Ne transmission antennas may be used, the first through the Ne-th antennas may be used, and Ne transmission antennas may be specified by antenna identifiers (ID) according to CRC error detection results and channel estimation results.

Further, the adjustment of the number of signals is not limited to specifying Ne antenna identifiers, but also the adjustment can be carried out, e.g., by specifying the number of directional beams that are formed, and by specifying beam identifiers.

As described above, at Step S106, since the number of transmitting signals is adjusted at a predetermined interval according to the value of the average of the SINR margins based on the CRC error detection result, the precision of transmission rate control is improved.

With reference to FIG. 4 once again, after the determination of the number of transmitting signals at S106, the process proceeds to Step S107. Further, if t is not equal to kT (i.e., not at the timing of adjusting the number of transmitting signals) at S105, the process proceeds to Step S107 without adjusting the number of transmitting signals. At S107, the transmission rate of each transmitting signal is determined using the SINR estimated value calculated at S102, the SINR margin obtained at S104, and a look-up table. That is, based on the SINR value that is obtained by subtracting the SINR margin from the SINR estimated value, the number of modulation levels, and the encoding rate are determined using the look-up table.

Figure 6:
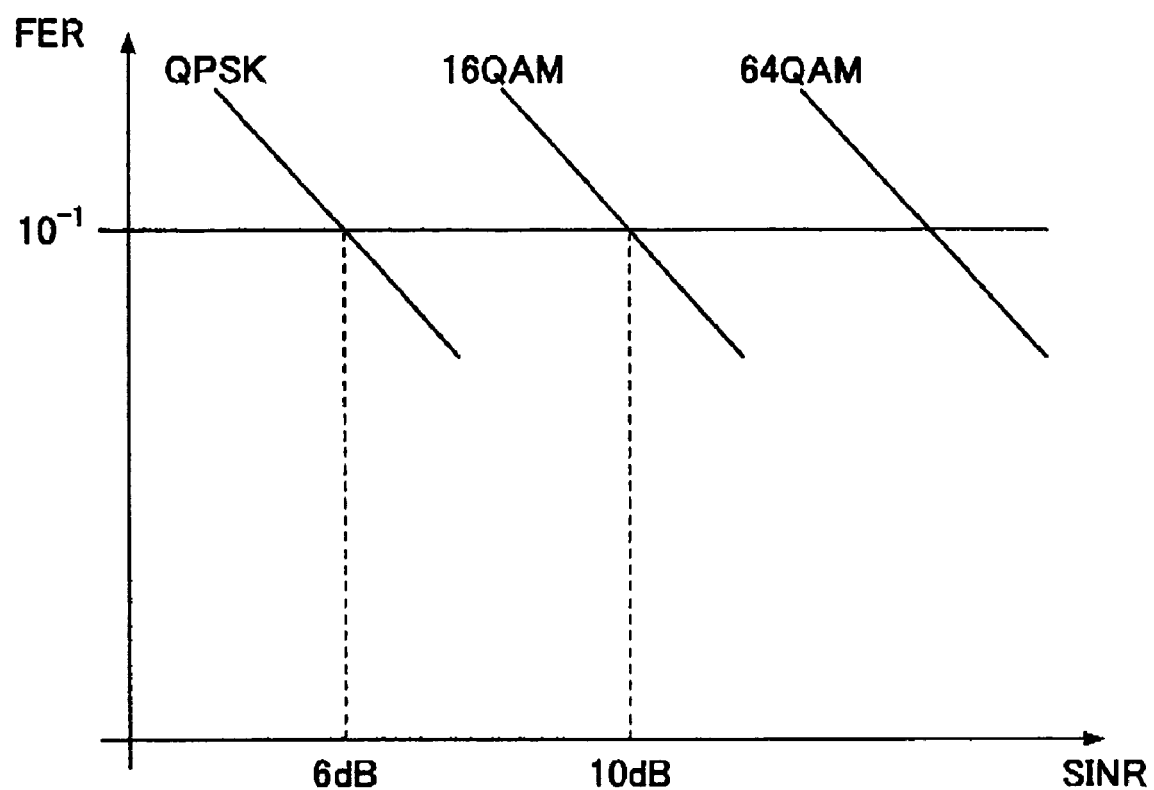
FIG. 6 is a graph showing an example of a look-up table.

FIG. 6 shows an example of the look-up table. In this example, the look-up table gives the SINR and the number of modulation levels that correspond to a desired frame error rate (FER). For example, when Target FER is set to $10^{-1}$ and the SINR estimated value of the i-th transmitting signal is set to 10 dB, the signal can be transmitted by 16QAM. However, there is the case wherein the CRC error detection result is NG, and the signal may not be properly transmitted by 16QAM. In this case, the SINR margin of the i-th transmitting signal is increased by "delta_down" at Step S104. If, for example, a result of subtracting the increased SINR margin from the SINR estimated value becomes 7 dB, the transmission rate determining unit selects QPSK based on the look-up table as the modulation technique.

In this way, the number of modulation levels, i.e., the modulation technique, is not theoretically determined, but adaptively determined based on the actual propagation situation by adjusting the SINR margin such that the rate control is optimized for the communication system using the MIMO method.

With reference to FIG. 4, once the transmission rate of each transmitting signal is determined, the transmission rate and the number of transmitting signals are fed back to the transmitter at Step S108. Then, at Step S109, whether communication is completed is determined. If negative, i.e., the communication is ongoing, the frame number is incremented from t to t+1, and the process is repeated from Step S102.

The parameters X, Y, T, "delta_up", "delta_down", and the look up table are made available by in advance setting up optimal values by computer simulation.

In the example described above, the number of transmission antennas is adjusted according to the SINR margin value; however, the number of transmitting signals may be adjusted based on the frame error rate (FER) and system throughput of the corresponding transmitting signals, which are periodically observed.

Further, it is also possible to fix the number of transmitting signals, and to perform the above-described control depending on the processing load of the transmission rate determining unit 26.

FIG. 7 is a block diagram showing the structure of the transceiver according to the second embodiment of the present invention. Here, the number of signals and the transmission rate of each transmitting signal are determined by the transmitter based on the channel estimate calculated and the CRC error detection result obtained on the receiver.

The transceiver according to the second embodiment includes a transmitter 50, and a receiver 60. The transmitter 50 includes two or more transmission antennas 51-1 through 51-N for individually transmitting N signals, CRC bit adding units 52-1 through 52-N for adding CRC bits to each of the information bit sequence divided into N pieces, encoder/mappers 53-1 through 53-N, and a transmission rate determining unit 56. The transmission rate determining unit 56 adjusts at a predetermined interval the number of signals to be transmitted from the transmission antennas 51-1 through 51-N, while determining the transmission rate of the transmitting signals based on the channel information and the error detection result that are received from the receiver 60.

The receiver 60 includes K receiving antennas 61-1 through 61-K for receiving the N signals, and a channel estimating unit 62 for estimating the propagation situation of a channel, for example, SINR, of each of the N signals. The receiver 60 further includes a detector 63 for detecting the N signals using a channel estimation result, and for providing the detected signals to respective de-mapper/decoders 64-1 through 64-N. The de-mapper/decoders 64-1 through 64-N decode and de-map the detected signal, and provide the decoded/de-mapped signals to respective CRC error detecting units 65-1 through 65-N. The CRC error detecting units 65-1 through 65-N perform error detection using the CRC codes.

A channel estimation result obtained by the channel estimating unit 62, and the error detection result obtained by the CRC error detecting units 65-1 through 65-N are provided to the transmission rate determining unit 56 of the transmitter 50 from the receiver 60. The transmission rate determining unit 56 determines the number of transmitting signals, and the encoding rate R_i and the number of modulation levels M_i of each transmitting signal according to the process described with reference to FIGS. 4 and 5 based on the SINR estimated value and the error detection result of each transmitting signal received from the receiver 60.

Here, instead of the channel estimation information that is fed back to the transmitter 50 from the receiver 60 according to the second embodiment, the SINR computed by the receiver may be fed back. Thereby, the amount of information to feed back to the transmitter 50 can be reduced.

Further, although illustration is omitted, if a channel can be estimated by the transmitter, the rate may be determined using the channel information estimated by the transmitter.

Further, it is possible to configure such that the rate is determined based on the SINR information without using the error detection result by the receiver 60, and the determined rate and an error detection result are fed back to the transmitter 50; then, the transmitter 50 re-determines the rate using the rate and the error detection result provided by the receiver 60. In this way, the processing workload can be distributed between the receiver 50 and the transmitter 60.

According to the configuration of the second embodiment, the transmitter determines or adjusts the transmission rate, and consequently, the processing workload of the receiver is mitigated. In addition, in the second embodiment, the determination of the number of transmitting signals may be carried out by specifying identifiers of antennas,
by selecting desired Ne antennas out of the N antennas,
by selecting desired N directional beams out of the N beams, and
by specifying identifiers of the beams.

Further, as for the embodiments described above, although the receiver and the transmitter are individually illustrated for convenience of explanation, both the transmitter and the receiver have both transmitting and receiving capabilities.

Further, the present invention is not limited to these embodiments, but variations and modifications may be made without departing from the scope of the present invention.

The present application is based on Japanese Priority Application No. 2004-190015 filed on Jun. 28, 2004 with the Japanese Patent Office, the entire contents of which are hereby incorporated by reference.

What is claimed is:

1. A transceiver, comprising:
one or more antennas configured to receive a plurality of transmitting signals transmitted by a plurality of transmission antennas;
a channel estimating unit configured to estimate a channel of each of the transmitting signals;
an error detecting unit configured to perform error detection for each of the transmitting signals based on reliability information added to the corresponding transmitting signal; and
a transmission rate determining unit configured to determine a transmission rate of each of the transmitting signals based on at least one of a channel estimation result from the channel estimating unit and an error detection result from the error detecting unit for the corresponding transmitting signal, to adjust the number of the transmission antennas used for transmission or a number of directional beams formed by at least one of the transmission antennas, based on the channel estimation result and the error detection result, and to specify, at a predetermined interval, one of a set of identifiers of the transmission antennas used for the transmission, and a set of identifiers of the directional beams formed by the at least one of the transmission antennas.

2. The transceiver as claimed in claim 1, wherein
the transmission rate determining unit is configured to adjust the number of the transmission antennas, which are configured to individually transmit the transmitting signals; and
the transmission rate determining unit is configured to determine the transmission rate of each of the transmitting signals based on at least one of the channel estimation result of the corresponding transmitting signal, and the error detection result, which is based on the reliability information added to the corresponding transmitting signal.

3. The transceiver as claimed in claim 1, wherein the transmission rate determining unit is configured to calculate an SINR margin of each of the transmitting signals based on the corresponding channel estimation result and the corresponding error detection result, and to determine the transmission rate of each of the transmitting signals based on the corresponding SINR margin and the corresponding channel estimation result.

4. The transceiver as claimed in claim 3, wherein the transmission rate determining unit is configured to determine the transmission rate of each of the transmitting signals with reference to a predetermined look-up table, based on the corresponding SINR margin and the corresponding channel estimation result.

5. The transceiver as claimed in claim 1, wherein the transmission rate determining unit is configured to calculate a SINR margin of each of the transmitting signals based on the corresponding channel estimation result and the corresponding error detection result, to calculate an average of the SINR margins of all the currently transmitting signals at a predetermined interval, and to adjust the number of the transmission antennas or the number of the directional beams based on the average.

6. A transmitting-receiving method of a multiple antenna system, comprising:
estimating a channel of each of a plurality of transmitting signals transmitted using a plurality of transmission antennas;
performing error detection for each of the transmitting signals based on reliability information beforehand added to the corresponding transmitting signal;
determining a transmission rate of each of the transmitting signals based on at least one of a corresponding channel estimation result from the estimating and a corresponding error detection result from the performing;
adjusting the number of the transmission antennas used for transmission or a number of directional beams formed by at least one of the transmission antennas based on the corresponding channel estimation result and the corresponding error detection result; and
specifying, at a predetermined interval, one of a set of identifiers of the transmission antennas used for the transmission, and a set of identifiers of the directional beams formed by the at least one of the transmission antennas.

7. The transmitting-receiving method as claimed in claim 6, wherein the determining includes
calculating an SINR margin of each of the transmitting signals based on the corresponding channel estimation result and the corresponding error detection result, and
determining the transmission rate of each of the transmitting signals based on the corresponding SINR margin and the corresponding channel estimation result.

8. The transmitting-receiving method as claimed in claim 7, wherein the adjusting includes
determining whether a frame number currently being processed is an integral multiple of a predetermined interval,
calculating an average of the SINR margins of all the currently transmitting signals when the frame number is an integral multiple of the predetermined interval, and
adjusting the number of the transmission antennas or the number of the directional beams based on the average.

9. The transceiver as claimed in claim 1, wherein the transmission rate determining unit is configured to adjust the number of the transmission antennas or the number of the directional beams at a predetermined interval.

10. The transmitting-receiving method as claimed in claim 6, wherein the adjusting is performed at a predetermined interval.

11. A transceiver, comprising:
one or more antennas configured to receive a plurality of transmitting signals transmitted by a plurality of transmission antennas;
means for estimating a channel of each of the transmitting signals;
means for performing error detection for each of the transmitting signals based on reliability information added to the corresponding transmitting signal; and
means for determining a transmission rate of each of the transmitting signals based on at least one of a channel estimation result from the means for estimating and an error detection result from the means for performing for the corresponding transmitting signal, for adjusting the number of the transmission antennas used for transmission or a number of directional beams formed by at least one of the transmission antennas, based on the channel estimation result and the error detection result, and for specifying, at a predetermined interval, one of a set of identifiers of the transmission antennas used for the transmission, and a set of identifiers of the directional beams formed by the at least one of the transmission antennas.

12. The transceiver as claimed in claim 11, wherein the means for determining adjusts the number of the transmission antennas or the number of the directional beams at a predetermined interval.

* * * * *